(12) United States Patent
Lin

(10) Patent No.: US 12,391,087 B2
(45) Date of Patent: Aug. 19, 2025

(54) ROBOT AND ADJUSTMENT METHOD FOR SUSPENSION SYSTEM OF ROBOT

(71) Applicant: HAI ROBOTICS CO., LTD., Guangdong (CN)

(72) Inventor: Han Lin, Guangdong (CN)

(73) Assignee: HAI ROBOTICS CO., LTD., Guangdong (CN)

( * ) Notice: Subject to any disclaimer, the term of this patent is extended or adjusted under 35 U.S.C. 154(b) by 0 days.

(21) Appl. No.: 18/535,041

(22) Filed: Dec. 11, 2023

(65) Prior Publication Data

US 2024/0100901 A1 Mar. 28, 2024

Related U.S. Application Data

(63) Continuation of application No. PCT/CN2022/097960, filed on Jun. 9, 2022.

(30) Foreign Application Priority Data

Jun. 16, 2021 (CN) .......................... 202110669550.2

(51) Int. Cl.
*B60G 17/0165* (2006.01)
*B60G 17/019* (2006.01)

(52) U.S. Cl.
CPC ... *B60G 17/0165* (2013.01); *B60G 17/01908* (2013.01); *B60G 2400/208* (2013.01);
(Continued)

(58) Field of Classification Search
CPC .......... B60G 17/0165; B60G 17/01908; B60G 2400/208; B60G 2400/50; B60G 2400/60;
(Continued)

(56) References Cited

U.S. PATENT DOCUMENTS

| 4,805,102 A | 2/1989 | Ise et al. |
| 6,416,061 B1 | 7/2002 | French et al. |

(Continued)

FOREIGN PATENT DOCUMENTS

| CN | 105479433 A | 4/2016 | |
| CN | 109515553 A * | 3/2019 | ............. B60G 17/00 |

(Continued)

OTHER PUBLICATIONS

Ayat, DE 102015205369 A1, Machine Translation of Specification (Year: 2015).*

(Continued)

*Primary Examiner* — Paul N Dickson
*Assistant Examiner* — Matthew Joseph Ganci
(74) *Attorney, Agent, or Firm* — Frank Gao, Esq.

(57) ABSTRACT

The present disclosure provides a robot and an adjustment method for a suspension system of a robot. The robot includes a robot body, a detection system, and a controller. The robot body includes a mobile chassis. The mobile chassis includes a suspension system. The detection system and the suspension system are electrically connected to the controller. The detection system is configured to detect operating information of the robot body. The controller is configured to control the suspension system to adjust a suspension hardness of the suspension system based on the operating information. The operating information includes at least one of ground information during operation of the robot body and pose information of the robot body.

10 Claims, 3 Drawing Sheets

(52) U.S. Cl.
CPC ...... *B60G 2400/50* (2013.01); *B60G 2400/60* (2013.01); *B60G 2400/821* (2013.01); *B60G 2400/822* (2013.01)

(58) Field of Classification Search
CPC ........ B60G 2400/821; B60G 2400/252; B60G 2400/82; B60G 2800/214; B60G 17/016; B60G 17/019; B60G 2800/91
See application file for complete search history.

(56) References Cited

U.S. PATENT DOCUMENTS

| | | | |
|---|---|---|---|
| 2014/0049012 A1 | 2/2014 | Ono et al. | |
| 2014/0125018 A1* | 5/2014 | Brady | B60G 17/016 280/5.519 |
| 2014/0195112 A1 | 7/2014 | Lu et al. | |
| 2018/0203451 A1 | 7/2018 | Cronin et al. | |
| 2019/0225464 A1 | 7/2019 | Tranchero | |
| 2021/0094376 A1* | 4/2021 | Smith | G06Q 10/087 |

FOREIGN PATENT DOCUMENTS

| | | | |
|---|---|---|---|
| CN | 110497761 A | 11/2019 | |
| CN | 110901327 A | 3/2020 | |
| CN | 111347831 A | 6/2020 | |
| CN | 111361380 A | 7/2020 | |
| CN | 111391596 A | 7/2020 | |
| CN | 112298395 A | 2/2021 | |
| CN | 113320347 A | 8/2021 | |
| DE | 102015205369 A1 * | 10/2015 | ......... B60G 17/0155 |
| JP | H06344750 A | 12/1994 | |
| WO | WO-2020081977 A1 * | 4/2020 | ......... B60G 17/0165 |
| WO | WO2020124592 A1 | 6/2020 | |
| WO | WO2021107554 A2 | 6/2021 | |

OTHER PUBLICATIONS

Cui, CN 109515553 A, Machine Translation of Specification (Year: 2019).*

International Search Report mailed Aug. 23, 2022; PCT/CN2022/097960.

* cited by examiner

ROBOT AND ADJUSTMENT METHOD FOR SUSPENSION SYSTEM OF ROBOT

CROSS-REFERENCE TO RELATED APPLICATIONS

This application is a continuation of International Patent Application No. PCT/CN2022/097960 filed on Jun. 9, 2022, which claims priority to Chinese Patent Application No. 202110669550.2, filed with the China National Intellectual Property Administration on Jun. 16, 2021 and entitled "ROBOT AND ADJUSTMENT METHOD FOR SUSPENSION SYSTEM OF ROBOT", which is incorporated by reference herein in its entirety.

TECHNICAL FIELD

The present disclosure relates to the field of intelligent warehousing and logistics, and in particular, to a robot and an adjustment method for a suspension system of a robot.

BACKGROUND

Intelligent warehousing is an important part of a logistics process. Application of the intelligent warehousing ensures quick and accurate data input in all parts of warehouse management. In this way, enterprises can learn real inventory data timely and accurately, thereby properly maintaining and controlling inventory of the enterprises.

A warehousing system may include a robot. The robot includes a robot body and a spring-loaded shock absorbing suspension. The robot body includes a mobile chassis, and the mobile chassis includes a driving wheel. The spring-loaded shock absorbing suspension is connected to the driving wheel, the mobile chassis drives the robot body to move within a warehouse, and the robot body carries storage boxes.

However, the robot has different operating information, and the spring-loaded shock absorbing suspension cannot be adjusted after being set, resulting in poor operating stability of the robot.

SUMMARY

The present disclosure provides a robot and an adjustment method for a suspension system of a robot, which may adjust a suspension hardness of the suspension system based on operating information of the robot, thereby improving operating stability of the robot.

In a first aspect, the present disclosure provides a robot, including a robot body, a detection system, and a controller. The robot body includes a mobile chassis. The mobile chassis includes a suspension system. The detection system and the suspension system are electrically connected to the controller.

The detection system is configured to detect operating information of the robot body. The controller is configured to control the suspension system to adjust a suspension hardness of the suspension system based on the operating information. The operating information includes at least one of ground information during operation of the robot body and pose information of the robot body.

In a possible implementation, in the robot provided in the present disclosure, the detection system may include a first detection member configured to detect the ground information, and the ground information may include at least one of uneven ground and slippery ground.

In a possible implementation, in the robot provided in the present disclosure, when the first detection member detects the uneven ground, the controller controls the suspension system to adjust the suspension hardness of the suspension system from a first suspension hardness range to a second suspension hardness range. The second suspension hardness range is less than the first suspension hardness range.

When the first detection member detects the slippery ground, the controller controls the suspension system to adjust the suspension hardness of the suspension system from the first suspension hardness range to a third suspension hardness range. The third suspension hardness range is greater than the first suspension hardness range.

When the first detection member detects the uneven and slippery ground, the controller controls the suspension system to adjust the suspension hardness of the suspension system from the first suspension hardness range to a fourth suspension hardness range, and the fourth suspension hardness range is between the second suspension hardness range and the third suspension hardness range.

In a possible implementation, in the robot provided in the present disclosure, the first detection member may include at least one of a three-dimensional camera, a laser radar, a two-dimensional camera, or a three-dimensional information sensor.

In a possible implementation, in the robot provided in the present disclosure, the first detection member is located on an upper portion or a top portion of the robot body, and a detection surface of the first detection member faces a front end of the robot body and faces the ground.

In a possible implementation, in the robot provided in the present disclosure, the pose information may include a pressure of the robot body on the ground, and the detection system may include a second detection member configured to detect the pressure.

In a possible implementation, in the robot provided in the present disclosure, when a variation range of the pressure is greater than or equal to a preset range, the controller controls the suspension system to adjust the suspension hardness of the suspension system from the first suspension hardness range to the second suspension hardness range.

In a possible implementation, in the robot provided in the present disclosure, the second detection member is a pressure sensor located on the suspension system.

In a possible implementation, in the robot provided in the present disclosure, the mobile chassis may further include a driving wheel, the pose information may include a rotational speed of the driving wheel, and the detection system may include a third detection member configured to detect the rotational speed of the driving wheel.

In a possible implementation, in the robot provided in the present disclosure, when the rotational speed of the driving wheel is greater than or equal to a preset rotational speed, the controller controls the suspension system to adjust the suspension hardness of the suspension system from the first suspension hardness range to the third suspension hardness range.

In a possible implementation, in the robot provided in the present disclosure, the third detection member is a wheel speed sensor.

In a possible implementation, in the robot provided in the present disclosure, the pose information may include a swing amplitude of the robot body, and the detection system may include a fourth detection member configured to detect the swing amplitude.

In a possible implementation, in the robot provided in the present disclosure, when the swing amplitude is greater than or equal to a preset amplitude, the controller controls the suspension system to adjust the suspension hardness of the suspension system from a first suspension hardness range to a fifth suspension hardness range. The fifth suspension hardness range is less than the first suspension hardness range.

In a possible implementation, in the robot provided in the present disclosure, at least three the fourth detection members are arranged, and the fourth detection members are respectively located on an upper portion, a middle portion, and a lower portion of the robot body.

In a possible implementation, in the robot provided in the present disclosure, the fourth detection member is an inertial measurement unit configured to detect an acceleration and a rotational speed at a mounting position of the inertial measurement unit.

In a possible implementation, in the robot provided in the present disclosure, the suspension system may include at least one of an air suspension, an electronic control hydraulic suspension, or an electromagnetic suspension.

In a possible implementation, in the robot provided in the present disclosure, the robot body may further include a carrying device and a column assembly, the carrying device is connected to the column assembly, is configured to ascend/descend relative to the column assembly, and is electrically connected to the controller, and the pose information may include that the carrying device is carrying a storage box. When the carrying device is carrying the storage box, the controller controls the suspension system to adjust the suspension hardness of the suspension system from the first suspension hardness range to a sixth suspension hardness range. The sixth suspension hardness range is greater than the first suspension hardness range.

In a second aspect, the present disclosure provides an adjustment method for a suspension system of a robot, including steps of:
  detecting operating information of the robot, where the operating information includes at least one of ground information during operation of the robot and pose information of the robot; and
  adjusting a suspension hardness of the suspension system of the robot based on the operating information.

In a possible implementation, in the adjustment method for a suspension system of a robot provided in the present disclosure, the ground information may include at least one of uneven ground and slippery ground.

The adjusting a suspension hardness of the suspension system of the robot based on the operating information may include:
  adjusting the suspension hardness of the suspension system from a first suspension hardness range to a second suspension hardness range when the ground information is the uneven ground, where the second suspension hardness range is less than the first suspension hardness range;
  adjusting the suspension hardness of the suspension system from the first suspension hardness range to a third suspension hardness range when the ground information is the slippery ground, where the third suspension hardness range is greater than the first suspension hardness range; and
  adjusting the suspension hardness of the suspension system from the first suspension hardness range to a fourth suspension hardness range when the ground information is the uneven and slippery ground, where the fourth suspension hardness range is between the second suspension hardness range and the third suspension hardness range.

In a possible implementation, in the adjustment method for a suspension system of a robot provided in the present disclosure, the pose information may include a pressure of the robot body on the ground.

The adjusting a suspension hardness of the suspension system of the robot based on the operating information may include:
  adjusting the suspension hardness of the suspension system from a first suspension hardness range to a second suspension hardness range when a variation range of the pressure is greater than or equal to a preset range, where the second suspension hardness range is less than the first suspension hardness range.

In a possible implementation, in the adjustment method for a suspension system of a robot provided in the present disclosure, the robot may include a mobile chassis, the mobile chassis may include a driving wheel, and the pose information may include a rotational speed of the driving wheel.

The adjusting a suspension hardness of the suspension system of the robot based on the operating information may include:
  adjusting the suspension hardness of the suspension system from a first suspension hardness range to a third suspension hardness range when the rotational speed is greater than or equal to a preset rotational speed, where the third suspension hardness range is greater than the first suspension hardness range.

In a possible implementation, in the adjustment method for a suspension system of a robot provided in the present disclosure, the pose information may include a swing amplitude of the robot.

The adjusting a suspension hardness of the suspension system of the robot based on the operating information may include:
  adjusting the suspension hardness of the suspension system from a first suspension hardness range to a fifth suspension hardness range when the swing amplitude is greater than or equal to a preset amplitude, where the fifth suspension hardness range is less than the first suspension hardness range.

In a possible implementation, in the adjustment method for a suspension system of a robot provided in the present disclosure, the pose information may include that a carrying device of the robot is carrying a storage box.

The adjusting a suspension hardness of the suspension system of the robot based on the operating information may include:
  adjusting the suspension hardness of the suspension system from a first suspension hardness range to a sixth suspension hardness range when the carrying device is carrying the storage box, where the sixth suspension hardness range is greater than the first suspension hardness range.

According to the robot and the adjustment method for a suspension system of a robot provided in the present disclosure, in the robot, the detection system, the suspension system, and the controller are arranged, and the detection system and the suspension system are both electrically connected to the controller. The detection system detects the operating information of the robot body, and the operating information includes at least one of the ground information during the operation of the robot body and the pose information of the robot body. The detection system transmits the detected operating information of the robot body to the controller, and the controller receives the operating information and controls the suspension system to adjust the suspension hardness of the suspension system based on the received operating information. The operating information includes at least one of the ground information during the operation of the robot body and the pose information of the robot body. The suspension hardness of the suspension system is adjusted based on different operating information, so that the suspension hardness of the suspension system of the robot matches a current state of the robot, that is, the suspension system has a suspension hardness that matches the operating information, thereby improving the operating stability of the robot.

BRIEF DESCRIPTION OF THE DRAWINGS

To describe the technical solutions of embodiments of the present disclosure or the related art more clearly, the drawings required for describing the embodiments or the related art are briefly described below. Apparently, the drawings in the following description show some of the embodiments of the present disclosure, and a person of ordinary skill in the art may derive other drawings from these drawings without creative efforts.

DESCRIPTION OF REFERENCE NUMERALS

Figure 1:
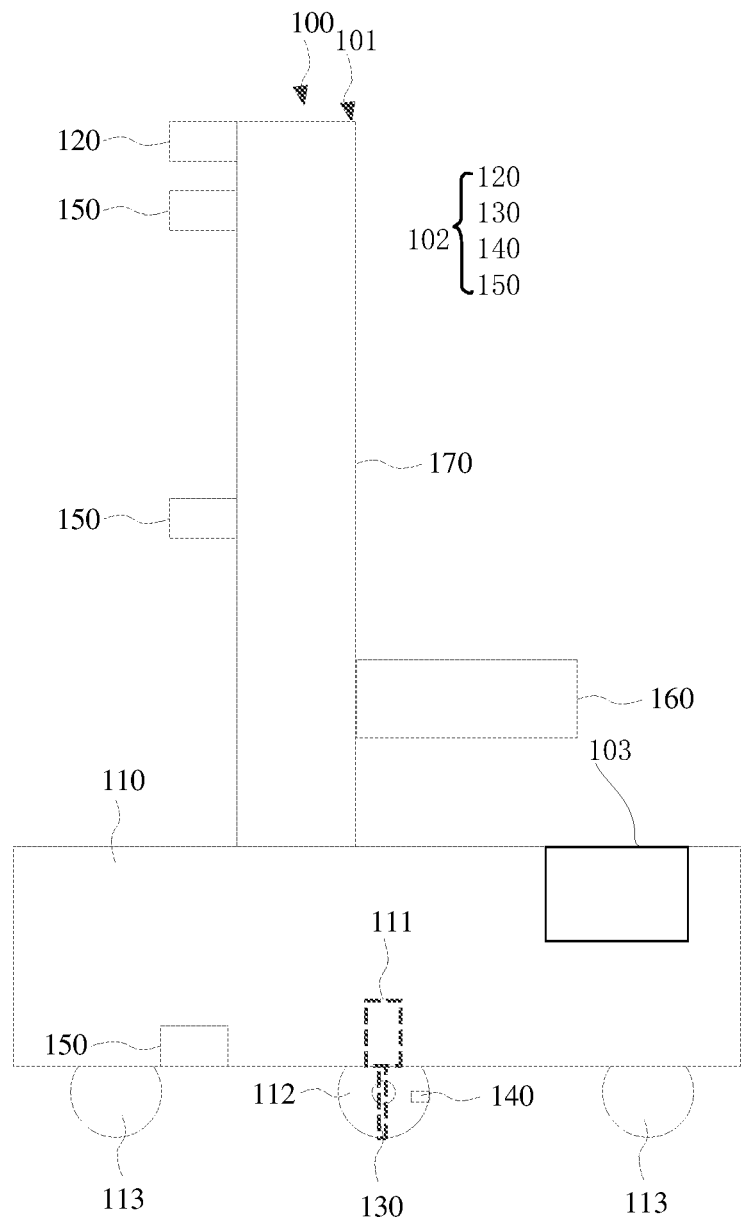
FIG. 1 is a schematic structural diagram of a robot according to some embodiments of the present disclosure.

100—Robot; 101—Robot body; 102—Detection system; 103—Controller;
110—Mobile chassis; 111—Suspension system; 112—Driving wheel; 113—Driven wheel;
120—First detection member;
130—Second detection member;
140—Third detection member;
150—Fourth detection member;
160—Carrying device;
170—Column assembly.

DETAILED DESCRIPTION

To make objectives, technical solutions, and advantages of the present disclosure clearer, technical solutions in embodiments of this application are described below in more detail with reference to drawings in preferred embodiments of the present disclosure. In the drawings, same or similar components or components having same or similar functions are denoted by same or similar reference numerals throughout the description. The described embodiments are merely some embodiments rather than all the embodiments of the present disclosure. The embodiments described below with reference to the drawings are exemplary, and are intended to explain the present disclosure and should not be construed as a limitation on the present disclosure. All other embodiments obtained by a person of ordinary skill in the art based on the embodiments of the present disclosure without making creative efforts shall fall within the protection scope of this application. The embodiments of the present disclosure are described in detail below with reference to the drawings.

In the description of the present disclosure, it should be noted that unless otherwise explicitly specified and defined, the terms "mounted", "connected", and "connection" are to be understood in a broad sense, for example, the connection may be a direct connection, an indirect connection through an intermediary, internal communication between two elements, or an interaction relationship between two elements. A person of ordinary skill in the art may understand the specific meanings of the foregoing terms in the present disclosure according to specific situations.

In the description of the present disclosure, it is to be understood that, orientation or position relationships indicated by terms such as "up", "down", "front", "rear", "vertical", "horizontal", "top", "bottom", "inner", and "outer" are orientation or position relationships shown based on the drawings, and are merely used for ease of describing the present disclosure and simplifying the description, rather than indicating or implying that the device or element has a particular orientation or is constructed and operated in a particular orientation, and therefore, cannot be construed as a limitation on the present disclosure.

The terms "first", "second", and "third" (if present) in the description, claims, and drawings of this application are intended to distinguish between similar objects but do not necessarily indicate a specific order or sequence. It is to be understood that data used in this way may be transposed where appropriate, so that the embodiments of the present disclosure described herein may be, for example, implemented in an order different from the order shown or described herein.

Moreover, the terms "include", "have" and any other variants are intended to cover the non-exclusive inclusion. For example, a process, a method, a system, a product, or a display that includes a list of steps or units is not necessarily limited to those expressly listed steps or units, but may include other steps or units not expressly listed or inherent to such a process, method, system, product, or display.

A warehousing system may include a robot. The robot includes a robot body and a spring-loaded shock absorbing suspension. The robot body includes a mobile chassis, and the mobile chassis includes a driving wheel. The spring-loaded shock absorbing suspension is connected to the driving wheel, the mobile chassis drives the robot body to move within a warehouse, and the robot body carries storage boxes. Factors such as construction quality, damage after long-term use, and unavoidable adverse working conditions result in uneven conditions such as pits and small foreign objects on a warehouse ground, or liquids exist on the ground, resulting in a slippery ground. In addition, since a plurality of layers of storage boxes may be stored on the robot along a vertical direction, a center of gravity of the robot is relatively high, and different suspension hardnesses are required in different operating states. However, the robot has different operating information, and a spring-loaded shock absorbing suspension cannot be adjusted after being set, resulting in poor operating stability of the robot.

Based on the above, the present disclosure provides a robot and an adjustment method for a suspension system of a robot, to adjust a suspension hardness of the suspension system based on operating information of the robot, thereby improving operating stability of the robot.

FIG. 1 is a schematic structural diagram of a robot according to some embodiments of the present disclosure. As shown in FIG. 1, this embodiment of the present disclosure provides a robot 100. The robot 100 includes a robot body, a detection system (not shown in the figure), and a controller (not shown in the figure). The robot body includes a mobile chassis 110. The mobile chassis 110 includes a suspension system 111. The detection system and the suspension system 111 are electrically connected to the controller.

The detection system is configured to detect operating information of the robot body. The controller is configured to control the suspension system 111 to adjust a suspension hardness of the suspension system 111 based on the operating information. The operating information includes at least one of ground information during operation of the robot body and pose information of the robot body.

During specific implementation, the mobile chassis 110 may include a chassis body (not shown in the figure), a driving assembly, and a driven wheel 113. The driving assembly and the driven wheel 113 are both connected to the chassis body. The driving assembly includes a driving member and a driving wheel 112. The driving member is connected to the chassis body. The driving member drives the driving wheel 112 to rotate to move the mobile chassis 110, and the driven wheel 113 is driven by the chassis body to rotate. Two driving assemblies may be arranged. The two driving assemblies are located on a middle portion of the chassis body. At least three driven wheels 113 may be arranged. In this embodiment, numbers and positions of the driven wheel 113 and the driving wheel 112 are not limited.

The suspension system 111 is located between the chassis body and the driving wheel 112, and one driving wheel 112 corresponds to one suspension system 111. The suspension system 111 is located between the chassis body and the driven wheel 113, and one driven wheel 113 also corresponds to one suspension system 111. The suspension system 111 transmits a force and a moment acting between the driven wheel 113 and the chassis body, or transmits a force and a moment acting between the driving wheel 112 and the chassis body, buffers impact transmitted to the robot from an uneven road surface, and attenuates vibration caused by the impact, to ensure stable operation of the robot. A structure, a principle, and a suspension hardness adjustment manner of the suspension system 111 are the same as those of a suspension system in a car. For details, refer to the suspension system in the car, and the details are not described herein.

During walking, the robot may face different ground information or have different poses. In this embodiment, the controller controls the suspension system 111 to adjust the suspension hardness of the suspension system 111 based on at least one of the ground information during the operation of the robot body and the pose information of the robot body.

In the present disclosure, the detection system and the suspension system 111 are both electrically connected to the controller. The detection system detects the operating information of the robot body, and the operating information includes at least one of the ground information during the operation of the robot body and the pose information of the robot body. The detection system transmits the detected operating information of the robot body to the controller, and the controller receives the operating information and controls the suspension system 111 to adjust the suspension hardness of the suspension system 111 based on the received operating information. The operating information includes at least one of the ground information during the operation of the robot body and the pose information of the robot body. The suspension hardness of the suspension system 111 is adjusted based on different operating information, so that the suspension hardness of the suspension system 111 of the robot matches a current state of the robot, that is, the suspension system 111 has a suspension hardness that matches the operating information, thereby improving the operating stability of the robot.

Detection manners of different operating information and corresponding adjustment of the suspension hardness of the suspension system 111 are described below.

In some embodiments, the detection system includes a first detection member 120. The first detection member 120 is configured to detect ground information, and the ground information is at least one of uneven ground and slippery ground.

It should be understood that a road surface on the uneven ground may be determined based on information such as a height or a coverage of a protrusion on the ground, a depth or a coverage of a recess on the ground, a slope of the ground, or a relief of the ground, or other factors. When the ground information meets the foregoing conditions, the first detection member 120 detects the uneven ground. The slippery ground may be determined depending on whether there is liquid on the ground. When there is liquid on the ground, the first detection member 120 detects the slippery ground.

In the robot 100 provided in this embodiment of the present disclosure, when the first detection member 120 detects the uneven ground, the controller controls the suspension system 111 to adjust the suspension hardness of the suspension system 111 from a first suspension hardness range to a second suspension hardness range. The second suspension hardness range is less than the first suspension hardness range.

When the first detection member 120 detects the slippery ground, the controller controls the suspension system 111 to adjust the suspension hardness of the suspension system 111 from the first suspension hardness range to a third suspension hardness range. The third suspension hardness range is greater than the first suspension hardness range.

When the first detection member 120 detects the uneven and slippery ground, the controller controls the suspension system 111 to adjust the suspension hardness of the suspension system 111 from the first suspension hardness range to a fourth suspension hardness range, and the fourth suspension hardness range is between the second suspension hardness range and the third suspension hardness range.

During specific implementation, the first detection member 120 is at least one of a three-dimensional camera, a laser radar, a two-dimensional camera, or a three-dimensional information sensor. That is to say, one to three first detection members 120 may be arranged, and the first detection members 120 may have the same structure or different structure. This is not limited in this embodiment, as long as the first detection member 120 can conveniently detect the ground information. For example, the three-dimensional camera or the laser radar may be used to detect whether the ground is even, the two-dimensional camera may be used identify whether there is liquid on the ground, and the three-dimensional information sensor may be used to identify whether there is a protrusion on the ground.

Specifically, the first detection member 120 is located on an upper portion or a top portion of the robot body, and a detection surface of the first detection member 120 faces a front end of the robot body and faces the ground. In this way, when the robot is about to reach the uneven ground and/or the slippery ground, the suspension hardness of the suspension system 111 may be adjusted in a timely manner.

In an embodiment, the pose information includes a pressure of the robot body on the ground, and the detection system includes a second detection member 130. The second detection member 130 is configured to detect the pressure.

Specifically, when a variation range of the pressure is greater than or equal to a preset range, the controller controls the suspension system 111 to adjust the suspension hardness of the suspension system 111 from the first suspension hardness range to the second suspension hardness range.

During specific implementation, the second detection member 130 is a pressure sensor located on the suspension system 111. A pressure variation of the robot body on the ground is sensed through the pressure sensor. When the variation range of the pressure is greater than or equal to the preset range, it is determined that the robot is located on the uneven ground. Since the second detection member 130 and the first detection member 120 may detect whether the robot is on the uneven ground through in different manners, accuracy of the detection is improved.

In the present disclosure, the pose information includes a rotational speed of the driving wheel 112, and the detection system includes a third detection member 140. The third detection member 140 is configured to detect the rotational speed of the driving wheel 112.

Specifically, when the rotational speed of the driving wheel 112 is greater than or equal to a preset rotational speed, the controller controls the suspension system 111 to adjust the suspension hardness of the suspension system 111 from the first suspension hardness range to the third suspension hardness range. An adhesion force of the ground may be determined through detection whether the driving wheel 112 is slipping. When the rotational speed of the driving wheel 112 is greater than or equal to the preset rotational speed, it indicates that the robot is on the slippery ground at this time. Since the third detection member 140 and the first detection member 120 detect whether the robot is on the slippery ground in different manners, accuracy of the detection is improved.

It should be understood that one driving wheel 112 corresponds to one third detection member 140, and one driven wheel 113 corresponds to one third detection member 140, to determine a range or a position of the slippery ground.

During specific implementation, the third detection member 140 is a wheel speed sensor.

In some embodiments, the pose information includes a swing amplitude of the robot body, and the detection system includes a fourth detection member 150. The fourth detection member 150 is configured to detect the swing amplitude.

Specifically, when the swing amplitude is greater than or equal to a preset amplitude, the controller controls the suspension system 111 to adjust the suspension hardness of the suspension system 111 from a first suspension hardness range to a fifth suspension hardness range. The fifth suspension hardness range is less than the first suspension hardness range.

During specific implementation, at least three of the fourth detection members 150 are arranged, and the fourth detection members 150 are respectively located on an upper portion, a middle portion, and a lower portion of the robot body.

The fourth detection member 150 is an inertial measurement unit configured to detect an acceleration and a rotational speed at a mounting position of the inertial measurement unit.

In this embodiment, through sensing of the acceleration and the rotational speed of the robot body through the inertial measurement unit, a current movement state of the robot and whether the robot is stable are determined (when the robot is in a shaking state, a front-to-rear acceleration and a left-to-right acceleration detected by a top inertial measurement unit are significantly greater than those detected by a bottom inertial measurement unit, and the values detected by the top inertial measurement unit are more unstable).

It should be noted that, the foregoing first suspension hardness range is a reference value, and the first suspension hardness range is a suspension hardness range of the robot 100 when stably walking on an even ground and a non-slippery road surface. Being less than the first suspension hardness range means reducing the suspension hardness of the suspension system 111, and being greater than the first suspension hardness range means increasing the suspension hardness of the suspension system 111.

In the robot 100 provided in this embodiment of the present disclosure, the suspension system 111 may be an active suspension. Specifically, the suspension system 111 is at least one of an air suspension, an electronic control hydraulic suspension, or an electromagnetic suspension.

In the present disclosure, the robot body further includes a carrying device 160 and a column assembly 170. The carrying device 160 is connected to the column assembly 170, and may ascend/descend relative to the column assembly 170. The carrying device 160 is electrically connected to the controller. The pose information includes that the carrying device 160 is carrying a storage box. When the carrying device 160 is carrying the storage box, the controller controls the suspension system 111 to adjust the suspension hardness of the suspension system 111 from the first suspension hardness range to a sixth suspension hardness range. The sixth suspension hardness range is greater than the first suspension hardness range. That is to say, when the robot needs to take out the storage box, the suspension hardness of the suspension system 111 is increased, to ensure stability of the robot when taking out the storage box. When the robot needs to take out the storage box, the suspension hardness of the suspension system 111 may be a maximum suspension hardness of the suspension system 111.

Figure 2:
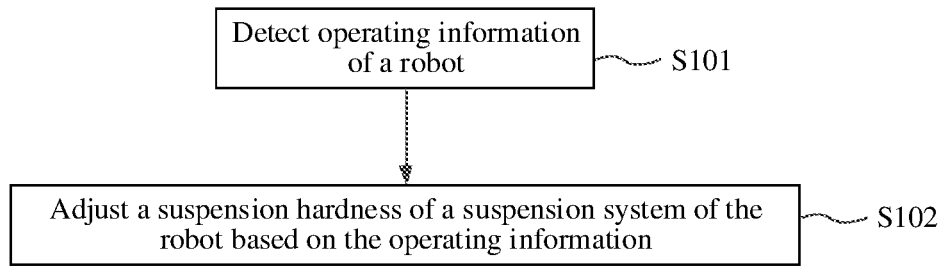
FIG. 2 is a first flowchart of an adjustment method for a suspension system of a robot according to some embodiments of the present disclosure.

FIG. 2 is a first flowchart of an adjustment method for a suspension system of a robot according to some embodiments of the present disclosure. As shown in FIG. 2, this embodiment of the present disclosure further provides the adjustment method for a suspension system of a robot. The robot may be a robot provided in any of the foregoing embodiments. A structure and a principle of the robot have been described in the above embodiments, and therefore are not described herein.

The adjustment method for a suspension system of a robot includes the following steps:

S101: Detect operating information of a robot 100, where the operating information includes at least one of ground information during operation of the robot 100 and pose information of the robot 100.

Specifically, the operating information of the robot 100 may be detected through a detection system.

S102: Adjust a suspension hardness of a suspension system 111 of the robot 100 based on the operating information.

Specifically, the detection system and the suspension system 111 are both electrically connected to the controller. The detection system detects the operating information of the robot 100. The operating information includes at least one of the ground information during the operation of the robot 100 and the pose information of the robot 100. The detection system transmits the detected operating information of the robot 100 to the controller, and the controller receives the operating information and controls the suspension system 111 to adjust the suspension hardness of the suspension system 111 based on the received operating information. The operating information includes at least one of the ground information during the operation of the robot 100 and the pose information of the robot 100. The suspension hardness of the suspension system 111 is adjusted based on different operating information, so that the suspension hardness of the suspension system 111 of the robot matches a current state of the robot, that is, the suspension system 111 has a suspension hardness that matches the operating information, thereby improving the operating stability of the robot 100.

Figure 3:
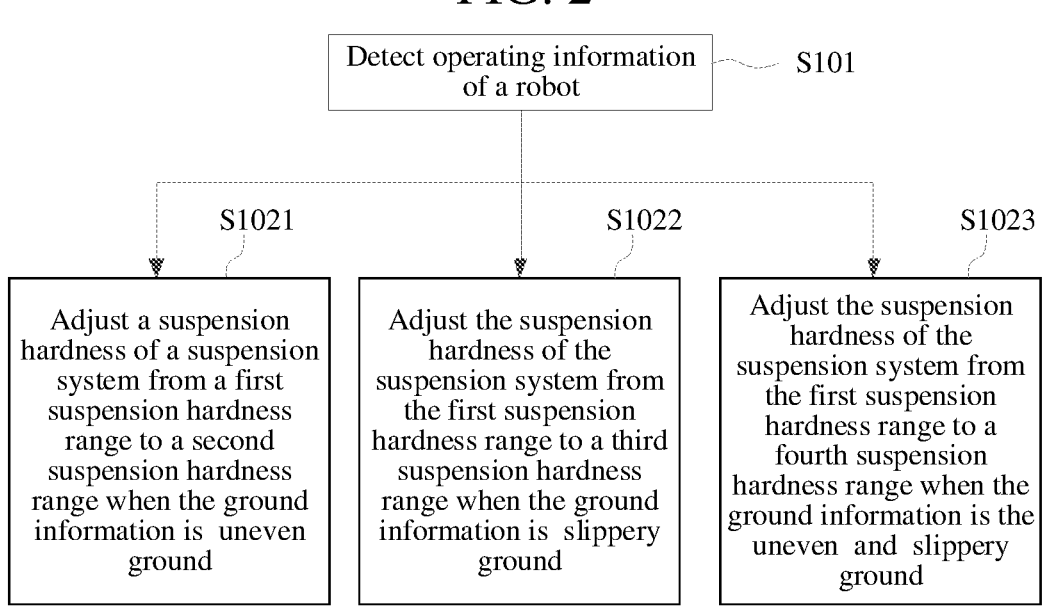
FIG. 3 is a second flowchart of an adjustment method for a suspension system of a robot according to some embodiments of the present disclosure.

FIG. 3 is a second flowchart of an adjustment method for a suspension system of a robot according to some embodiments of the present disclosure. As shown in FIG. 3, in the adjustment method for a suspension system of a robot provided in this embodiment of the present disclosure, the ground information is at least one of uneven ground and slippery ground.

The adjustment of the suspension hardness of the suspension system 111 of the robot 100 based on the operating information includes the following actions:

S1021: Adjust the suspension hardness of the suspension system 111 from a first suspension hardness range to a second suspension hardness range when the ground information is the uneven ground, where the second suspension hardness range is less than the first suspension hardness range.

S1022: Adjust the suspension hardness of the suspension system 111 from the first suspension hardness range to a third suspension hardness range when the ground information is the slippery ground, where the third suspension hardness range is greater than the first suspension hardness range.

S1023: Adjust the suspension hardness of the suspension system 111 from the first suspension hardness range to a fourth suspension hardness range when the ground information is the uneven and slippery ground, where the fourth suspension hardness range is between the second suspension hardness range and the third suspension hardness range.

It should be noted that, there is no sequence between actions S1021, S1022, and S1023, and different actions are performed based on the different ground information.

Specifically, the detection system may include a first detection member 120. The ground information is detected through the first detection member 120. The first detection member 120 is at least one of a three-dimensional camera, a laser radar, a two-dimensional camera, or a three-dimensional information sensor. That is to say, one to three first detection members 120 may be arranged, and the first detection members 120 may have the same structure or different structure. This is not limited in this embodiment, as long as the first detection member 120 can conveniently detect the ground information. For example, the three-dimensional camera or the laser radar may be used to detect whether the ground is even, the two-dimensional camera may be used identify whether there is liquid on the ground, and the three-dimensional information sensor may be used to identify whether there is a protrusion on the ground.

Figure 4:
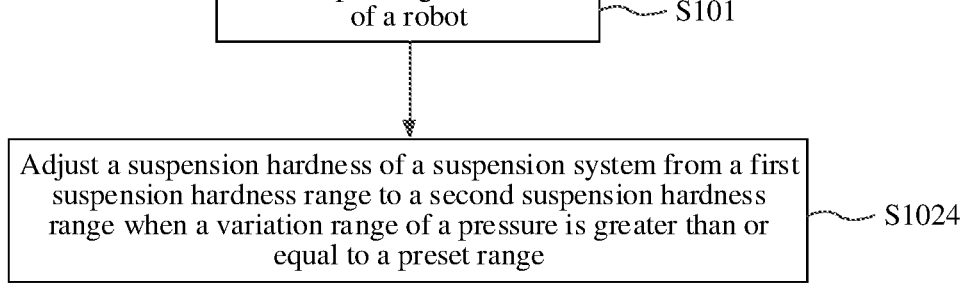
FIG. 4 is a third flowchart of an adjustment method for a suspension system of a robot according to some embodiments of the present disclosure.

FIG. 4 is a third flowchart of an adjustment method for a suspension system of a robot according to some embodiments of this application. As shown in FIG. 4, in the adjustment method for a suspension system of a robot provided in this embodiment of the present disclosure, the pose information includes a pressure of the robot 100 on the ground.

The adjustment of the suspension hardness of the suspension system 111 of the robot 100 based on the operating information includes the following action:

S1024: Adjust the suspension hardness of the suspension system 111 from a first suspension hardness range to a second suspension hardness range when a variation range of the pressure is greater than or equal to a preset range, where the second suspension hardness range is less than the first suspension hardness range.

Specifically, the detection system may include a second detection member 130. The pressure is detected through the second detection member 130. During specific implementation, the second detection member 130 is a pressure sensor located on the suspension system 111. A pressure variation of the robot on the ground is sensed through the pressure sensor. When the variation range of the pressure is greater than or equal to the preset range, it is determined that the robot is located on the uneven ground. Since the second detection member 130 and the first detection member 120 may detect whether the robot is on the uneven ground through in different manners, accuracy of the detection is improved.

Figure 5:
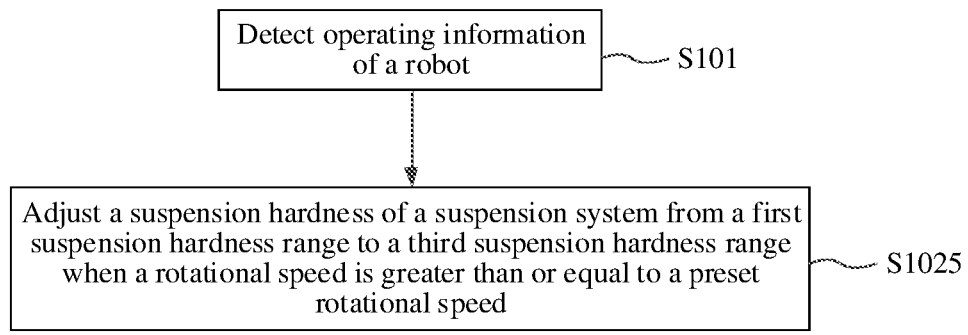
FIG. 5 is a fourth flowchart of an adjustment method for a suspension system of a robot according to some embodiments of the present disclosure.

FIG. 5 is a fourth flowchart of an adjustment method for a suspension system of a robot according to some embodiments of the present disclosure. As shown in FIG. 5, in the adjustment method for a suspension system of a robot provided in this embodiment of the present disclosure, the robot 100 includes a mobile chassis 110, the mobile chassis 110 includes a driving wheel 112, and the pose information includes a rotational speed of the driving wheel 112.

The adjustment of the suspension hardness of the suspension system 111 of the robot 100 based on the operating information includes the following action:

S1025: Adjust the suspension hardness of the suspension system 111 from a first suspension hardness range to a third suspension hardness range when the rotational speed is greater than or equal to a preset rotational speed, where the third suspension hardness range is greater than the first suspension hardness range.

Specifically, the detection system includes a third detection member 140. The rotational speed of the driving wheel 112 is detected through the third detection member 140. An adhesion force of the ground may be determined through detection whether the driving wheel 112 is slipping. When the rotational speed of the driving wheel 112 is greater than or equal to the preset rotational speed, it indicates that the robot is on the slippery ground at this time. Since the third detection member 140 and the first detection member 120 detect whether the robot is on the slippery ground in different manners, accuracy of the detection is improved.

Figure 6:
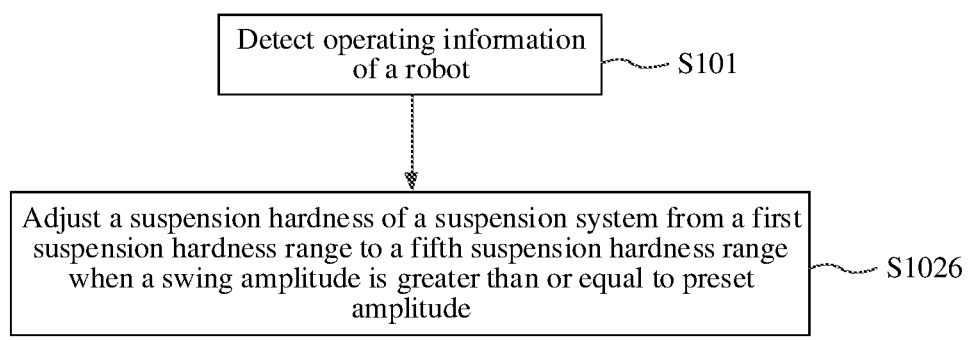
FIG. 6 is a fifth flowchart of an adjustment method for a suspension system of a robot according to some embodiments of the present disclosure.

FIG. 6 is a fifth flowchart of an adjustment method for a suspension system of a robot according to some embodiments of the present disclosure. As shown in FIG. 6, in the adjustment method for a suspension system of a robot provided in this embodiment of the present disclosure, the pose information includes a swing amplitude of the robot 100.

The adjustment of the suspension hardness of the suspension system 111 of the robot 100 based on the operating information includes the following action:

S1026: Adjust the suspension hardness of the suspension system 111 from a first suspension hardness range to a fifth suspension hardness range when the swing amplitude is greater than or equal to a preset amplitude, where the fifth suspension hardness range is less than the first suspension hardness range.

Specifically, the detection system includes a fourth detection member 150. The swing amplitude is detected through the fourth detection member 150. During specific implementation, the fourth detection member 150 is an inertial measurement unit configured to detect an acceleration and a rotational speed at a mounting position of the inertial measurement unit. At least one inertial measurement unit is arranged on each of the upper portion, the middle portion, and the lower portion of the robot. Through sensing of the acceleration and the rotational speed of the robot body through the inertial measurement unit, a current movement state of the robot and whether the robot is stable are determined (when the robot is in a shaking state, a front-to-rear acceleration and a left-to-right acceleration detected by a top inertial measurement unit are significantly greater than those detected by a bottom inertial measurement unit, and the values detected by the top inertial measurement unit are more unstable).

Figure 7:
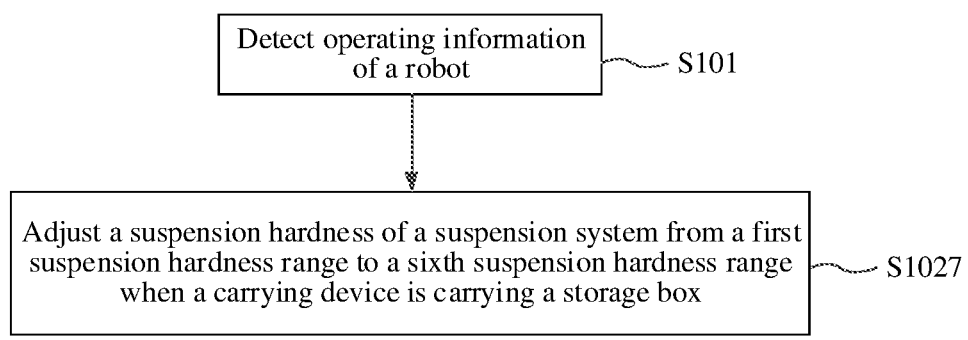
FIG. 7 is a sixth flowchart of an adjustment method for a suspension system of a robot according to some embodiments of the present disclosure.

FIG. 7 is a sixth flowchart of an adjustment method for a suspension system of a robot according to some embodiments of the present disclosure. As shown in FIG. 7, in the adjustment method for a suspension system of a robot provided in this embodiment of the present disclosure, the pose information includes that the carrying device 160 of the robot 100 is carrying a storage box.

The adjustment of the suspension hardness of the suspension system 111 of the robot 100 based on the operating information includes the following action:

S1027: Adjust the suspension hardness of the suspension system 111 from a first suspension hardness range to a sixth suspension hardness range when the carrying device 160 is carrying the storage box, where the sixth suspension hardness range is greater than the first suspension hardness range.

Specifically, the robot further includes the carrying device 160 and the column assembly 170. The carrying device 160 is connected to the column assembly 170, and may ascend/descend relative to the column assembly 170. The carrying device 160 is electrically connected to the controller. The pose information includes that the carrying device 160 is carrying the storage box. When the robot needs to take out the storage box, the suspension hardness of the suspension system 111 is increased, to ensure the stability of the robot when taking out the storage box. When the robot needs to take out the storage box, the suspension hardness of the suspension system 111 may be a maximum suspension hardness of the suspension system 111.

Finally, it should be noted that, the foregoing embodiments are merely used for describing the technical solutions of the present disclosure, but not to limit the present disclosure. Although the embodiments of the present disclosure are described in detail with reference to the foregoing embodiments, it should be understood by a person of ordinary skill in the art that, modifications may still be made to the technical solutions recorded in the foregoing embodiments, or equivalent replacements may be made to some or all of the technical features; and these modifications or replacements do not cause the essence of corresponding technical solutions to depart from the scope of the technical solutions in the embodiments of the present disclosure.

What is claimed is:

1. A robot, comprising a robot body, a detection system, and a controller, wherein the robot body comprises a mobile chassis, the mobile chassis comprises a suspension system, and the detection system and the suspension system are electrically connected to the controller; and the detection system is configured to detect operating information of the robot body, the controller is configured to control the suspension system to adjust a suspension hardness of the suspension system based on the operating information, and the operating information comprises ground information during operation of the robot body and pose information of the robot body;

wherein the pose information comprises a swing amplitude of the robot body, and the detection system comprises a fourth detection member configured to detect the swing amplitude;

wherein when the swing amplitude is greater than or equal to a preset amplitude, the controller controls the suspension system to adjust the suspension hardness of the suspension system from a first suspension hardness range to a fifth suspension hardness range, wherein the fifth suspension hardness range is less than the first suspension hardness range;

wherein at least three fourth detection members are arranged, and the fourth detection members are respectively located on an upper portion, a middle portion, and a lower portion of the robot body;

wherein each fourth detection member is an inertial measurement unit configured to detect an acceleration and a rotational speed at a mounting position of the inertial measurement unit, when the robot is in a swinging state, a front-to-rear acceleration and a left-to-right acceleration detected by the inertial measurement unit arranged on the upper portion are greater than those detected by the inertial measurement units arranged on the middle portion and the lower portion.

2. The robot according to claim 1, wherein the detection system comprises a first detection member configured to detect the ground information, and the ground information is at least one of uneven ground and slippery ground.

3. The robot according to claim 2, wherein when the first detection member detects the uneven ground, the controller controls the suspension system to adjust the suspension hardness of the suspension system from a first suspension hardness range to a second suspension hardness range, wherein the second suspension hardness range is less than the first suspension hardness range;

when the first detection member detects the slippery ground, the controller controls the suspension system to adjust the suspension hardness of the suspension system from the first suspension hardness range to a third suspension hardness range, wherein the third suspension hardness range is greater than the first suspension hardness range; and when the first detection member detects the uneven and slippery ground, the controller controls the suspension system to adjust the suspension hardness of the suspension system from the first suspension hardness range to a fourth suspension hardness range, and the fourth suspension hardness range is between the second suspension hardness range and the third suspension hardness range.

4. The robot according to claim 1, wherein the pose information comprises a pressure of the robot body on the ground, and the detection system comprises a second detection member configured to detect the pressure.

5. The robot according to claim 4, wherein when a variation range of the pressure is greater than or equal to a preset range, the controller controls the suspension system to adjust the suspension hardness of the suspension system from the first suspension hardness range to a second suspension hardness range, wherein the second suspension hardness range is less than the first suspension hardness range.

6. The robot according to claim 1, wherein the mobile chassis further comprises a driving wheel, the pose information comprises a rotational speed of the driving wheel, and the detection system comprises a third detection member configured to detect the rotational speed of the driving wheel.

7. The robot according to claim 6, wherein when the rotational speed of the driving wheel is greater than or equal to a preset rotational speed, the controller controls the suspension system to adjust the suspension hardness of the suspension system from the first suspension hardness range to a third suspension hardness range, wherein the third suspension hardness range is greater than the first suspension hardness range.

8. The robot according to claim 1, wherein the suspension system is at least one of an air suspension, an electronic control hydraulic suspension, or an electromagnetic suspension.

9. The robot according to claim 8, wherein the robot body further comprises a carrying device and a column assembly, the carrying device is connected to the column assembly, is configured to ascend/descend relative to the column assembly, and is electrically connected to the controller, the pose information comprises that the carrying device is carrying a storage box, and when the carrying device is carrying the storage box, the controller controls the suspension system to adjust the suspension hardness of the suspension system from the first suspension hardness range to a sixth suspension hardness range, wherein the sixth suspension hardness range is greater than the first suspension hardness range.

10. A robot, comprising a robot body, a detection system, and a controller, wherein the robot body comprises a mobile chassis, the mobile chassis comprises a suspension system, and the detection system and the suspension system are electrically connected to the controller; and the detection system is configured to detect operating information of the robot body, the controller is configured to control the suspension system to adjust a suspension hardness of the suspension system based on the operating information, and the operating information comprises ground information during operation of the robot body and pose information of the robot body;

wherein the detection system comprises a first detection member configured to detect the ground information, and the ground information comprises slippery ground;

wherein when the first detection member detects the slippery ground, the controller controls the suspension system to adjust the suspension hardness of the suspension system from the first suspension hardness range to a third suspension hardness range, wherein the third suspension hardness range is greater than the first suspension hardness range;

wherein the slippery ground is determined depending on whether there is liquid on the ground, when there is liquid on the ground, the first detection member detects the slippery ground.

* * * * *